April 3, 1951 A. FROMAGEOT ET AL 2,546,994

MULTIPLEX CARRIER CURRENT TELEPHONY

Filed Jan. 20, 1948 2 Sheets-Sheet 1

INVENTORS
ANTOINE FROMAGOET
MARC A. LALANDE
ROBERT A. REDARD
BY
Robert Harding
ATTORNEY April 3, 1951 A. FROMAGEOT ET AL 2,546,994

MULTIPLEX CARRIER CURRENT TELEPHONY

Filed Jan. 20, 1948 2 Sheets-Sheet 2

INVENTORS
ANTOINE FROMAGOET
MARC A. LALANDE
BY ROBERT A. REDARD
Robert Harding Jr.
ATTORNEY Patented Apr. 3, 1951

2,546,994

UNITED STATES PATENT OFFICE 2,546,994

MULTIPLEX CARRIER CURRENT TELEPHONY

Antoine Fromageot, Marc André Lalande, and Robert Redard, Paris, France, assignors to International Standard Electric Corporation, New York, N. Y., a corporation of Delaware Application January 20, 1948, Serial No. 3,208
In France May 15, 1945

Section 1, Public Law 690, August 8, 1946
Patent expires May 15, 1965

7 Claims. (Cl. 179—15)

The present invention relates to transmission systems and particularly to carrier current multiplex telephone systems.

According to certain features of the invention, use is made of a preliminary modulation of all the channels at one same selected frequency of a value higher than the maximum frequency transmitted over the line, this value being such that the products of this first modulation have a sufficient frequency spacing from the voice frequencies to permit use of a simple modulator for this first modulation.

According to another feature of the invention, the use of a first modulation frequency considerably higher than the maximum frequency transmitted over the line makes it possible to employ simple modulators for a second modulation that serves to bring back the various channels into the transmission band stepwise, since the modulation currents applied to these modulators fall outside of the band of frequencies transmitted over the line.

According to other features of the invention, at the output of the first modulators that all employ the same carrier, use is made of filters which serve for eliminating one side band and which have a steep cut-off in the vicinity of the carrier frequency but which do not require a rapid cut-off to the frequencies that correspond to the high voice frequencies, since the voice currents of the various channels are limited in advance by a low-pass filter of easy construction.

According to other features of the invention, the low frequency filters located ahead of the first modulation are eliminated and use is made at the output of the first modulators of filters having a pass band strictly limited to the width of the voice bands and consequently of the side band to be transmitted.

The invention is described hereunder for certain examples of embodiment and with reference to the appended drawings, in which.

Figure 1:
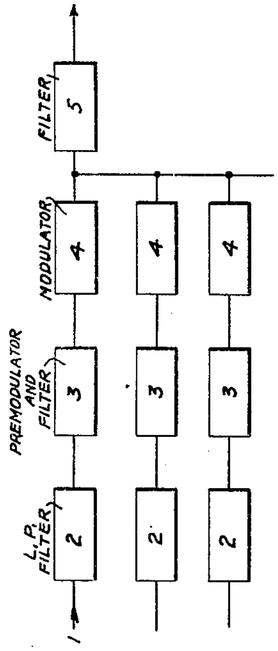
Fig. 1 is a simplified schematic of an embodiment.

Referring to Fig. 1, this shows an overall schematic of a carrier current system incorporating features of the invention. Reference number 1 indicates a voice frequency subscriber's line terminating at a filter having a pass band of given width, the same reference number indicating amplifier elements, if any. 2 indicates a filter followed by a filter 3. 4 indicates a second modulator, and 5 a filter terminating at the line. To make the description clearer, it is assumed that the band of frequencies transmitted over the line extends from 12 to 60 kilocycles and that the band of voice frequencies to be transmitted extends from 300 to 3400 cycles. Under these conditions, the characteristics of the various elements of a system like that shown in Fig. 1 would be as follows: At the transmitting end, the low-pass filter 2 limits the transmitted voice frequencies to 3400 cycles. The first modulator, or premodulator, 3 is fed by a carrier frequency, e. g. of between 80 and 150 kilocycles, that is higher than the maximum frequency to be transmitted, e. g. of 60 kilocycles.

Figure 2:
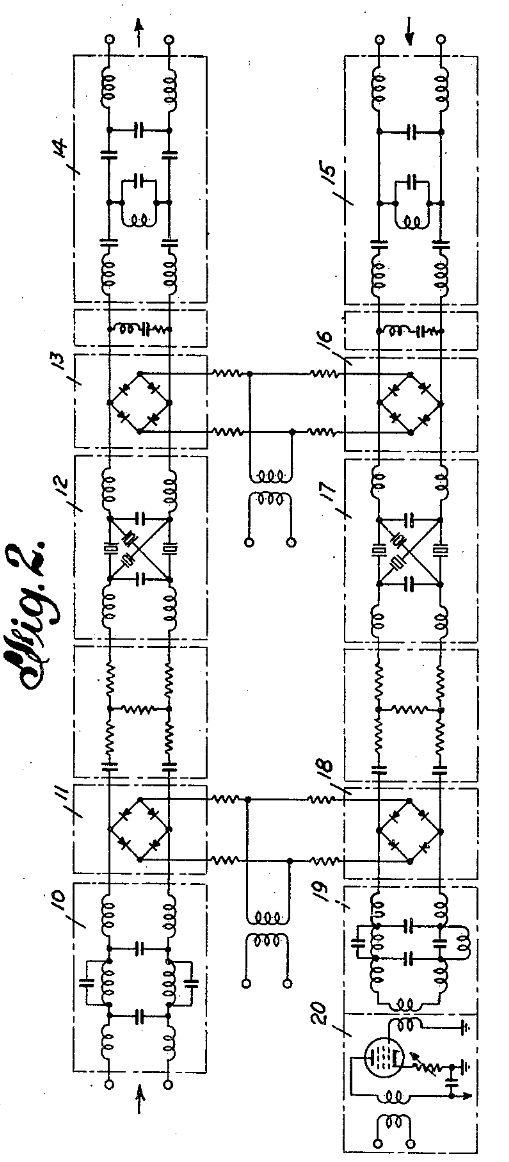
Fig. 2 is a schematic of an embodiment in greater detail.

Modulator 4 may be of a simple type, e. g. a so-called branched bridge modulator as shown in Fig. 2.

As a matter of fact, the useful modulation products are very widely separated in frequency from the modulating voice frequencies, and the latter are accordingly eliminated in the subsequent circuits without special precautions.

Modulator 3 is followed by a quartz filter which eliminates one of the modulation side bands and which completes the action of low-pass filter 2, limiting the band of voice frequencies to 3400 cycles in the selected example. The cut-off characteristic has to be sufficiently abrupt on the side of the pass band nearest the carrier current in order to effect suitable elimination of the second band, but the cut-off is not necessarily rapid at the other end of the pass band on which the action of low frequency low-pass filter 2 is considerable.

This filter is followed by a second modulator 4 which serves for bringing back the selected side band into the range of frequencies transmitted over the line, the carrier frequencies of the second modulators for the various lines being staggered by 4 kilocycles in the selected example. The selection of a first modulation frequency that is high as compared with the highest frequency transmitted over the line permits the use of simple modulators. Indeed it is no longer necessary to employ balanced modulators for eliminating in their output circuits the frequencies of the applied signals, since these have frequencies sufficiently far removed from the useful modulation products. The output filter 5, and also the modulator, may consequently be of a simplified type, since there is no need to separate closely adjoining frequencies.

Use can accordingly also be made in this case of simple modulators, such as bridge modulators, that do not stop the modulation frequencies.

The transmission systems according to the invention permit the construction of simple equipment.

The carrier frequency $P_o$ of 80 to 150 kcs. has been determined so that the blocking of the input signals of a modulator or of a demodulator may take place without difficulty in the filter disposed back of that element, and without necessitating the use of the ring modulators that are generally employed in carrier current systems and that require link transformers. For this purpose, $P_o$ has to be such that the frequencies of the modulation products are definitely different from those of the modulating signals, e. g. of the order of 80 kcs. or more. This frequency $P_o$ has also such a value as to facilitate the generation for the second modulators of the channel carrier frequencies of values $P_o \pm 4n$, $n$ being any integer from say 3 to 14 and the carrier frequency generating equipment has to be simple and sturdy. A known method that gives complete satisfaction consists in seeking these carrier frequencies among the harmonics of a fundamental oscillation. In using this method, it is advisable to employ channel carrier frequencies $P_o \pm 4n$ that are less than about 140 kcs., and this sets for $P_o$ a top limit of about 84 kcs. in the case of channel carrier frequencies of the form $P_o \div 4n$.

The value of 80 kcs. taken in the described example of embodiment corresponds to a premodulation filter 12 that is easy to construct by means of quartz crystals, which make it possible to obtain the required non-distortion in the transmitted band without the intervention of correctors. This quartz filter comprises a lattice section containing a single crystal in each arm. It is of the unilateral type, only comprising infinite attenuation frequencies on one side of the band of transmitted frequencies.

The voice frequency and modulation band pass or low-pass filters are ladder filters of the conventional type.

It is to be noted that the modulators employed are all of the branched bridge type. This type of modulator has the advantage of great simplicity, but it has two drawbacks which are here without effect on account of the dimensioning of the elements of the system. These modulators do not stop the modulation frequencies, but this is of no importance owing to the suitable selection of carrier $P_o$; also if used without special precautions, they have an output about 6 db. less than the usually employed ring modulator, but their output can be considerably increased to a value comparable to that of a ring modulator by suitable arrangement of the elements disposed on either side of the modulators. For this, it is sufficient for the circuits that receive the modulated signals to have a high impedance for the modulation signals, and for the circuits that furnish the modulation signals, to have a high impedance for the modulated signals. In case a modulator is placed directly at the input or output of a filter, the circuits of the filter are arranged so as to comply with this condition.

The conditions required from filters in a multichannel telephone system relate to the non-distortion of amplitude of the transmitted signals, and to the non-transmission of useless and disturbing signals, namely, signals that correspond to voice frequencies outside of the frequency band assigned to a channel, usually 4 kcs.; signals proceeding from unused modulation bands; and "image" frequency signals for the demodulation operations.

The two last conditions can only be satisfied by means of filters disposed back of the modulating element and in front of the demodulating element, but the two first mentioned conditions can be met by means of correctors and filters inserted in the voice frequency circuits, for example, or in any other suitable location.

Fig. 2 shows a first example of a system designed according to the features of the invention. Referring to this Fig. 2, it comprises at the transmitting end a filter 10 that helps to limit the transmitted voice frequencies to 3400 C. P. S., the transmission curve required from this filter being dependent on that of the two subsequent filters whose action it only serves to complete; a branched bridge premodulator 11 fed by a carrier frequency $P_o$ definitely higher than 60 kcs., e. g. of the order of 80 to 100 kcs.; a filter 12 which stops the unutilized premodulation band (top band) and also helps to limit the transmitted voice frequencies to the band of 300 to 3400 C. P. S., this filter being arranged in such a way that it does not introduce distortions in the amplitude of the transmitted signals, so that it does not require the presence of additional corrector elements; a branched bridge channel modulator 13 fed by one of the carrier frequencies $P_i = P_o + 4n$, $n$ being a whole number comprised between 3 and 14 inclusive; and a channel filter 14 which suppresses the unused modulation band and also completes the action of premodulation filter 12. This filter is also arranged in such a way that it does not introduce distortion in the amplitude of the transmitted signals.

At the receiving end, the illustrated system comprises a channel filter 15 that eliminates the image frequencies from the channel demodulation and helps to complete the action of the filter that precedes the second demodulation; a branched bridge channel demodulator 16 fed by one of the carrier frequencies $P_i = P_o + 4n$, $n$ being a whole number comprised between 3 and 14 inclusive; a second demodulation filter 17 which eliminates the image frequencies from the second modulation and helps to limit the received voice frequencies to 3400 C. P. S.; a second branched bridge demodulator 18 fed by the carrier frequency $P_o$; and a low frequency filter 19, associated to a low frequency amplifier, that helps to limit the received voice frequencies to 3400 C. P. S.

For the purpose of simplifying the drawing, the filters at the receiving end are shown in the schematic as being identical with the filters at the transmitting end.

Figure 3:
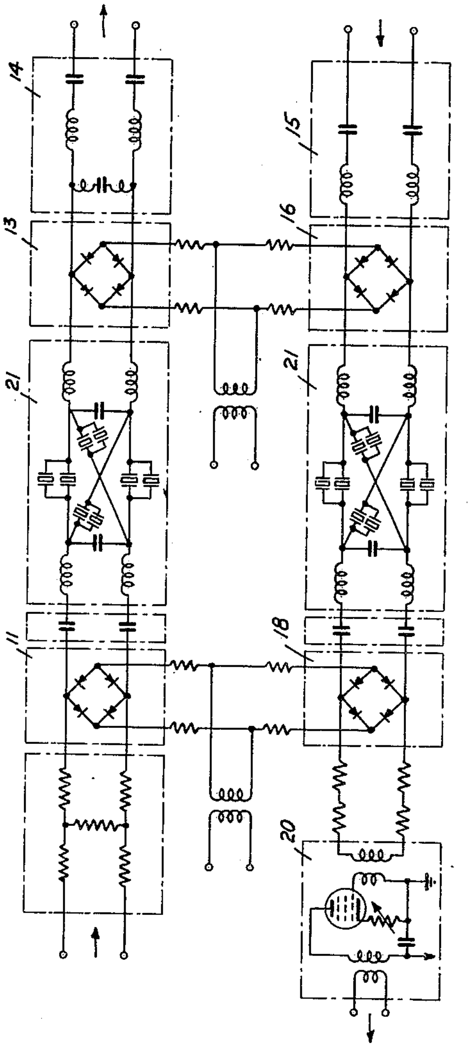
Fig. 3 is a schematic of another embodiment in greater detail.

A second embodiment shown in Fig. 3 comprises a filter 21 back of the first modulator 11 and in front of the second demodulator, this filter having such a characteristic (i. e. both sharp upper and lower cut-offs) that it becomes possible to eliminate the low frequency filters. The rest of the circuit is similar to that of Fig. 2 and will not be described in detail.

In this second embodiment, the common carrier frequency $P_o$ is 140 kcs. and the channel carrier frequencies are $P_o - 4n$. The filter that follows the first modulator, like the one that precedes the second demodulator, consists of a lattice section that comprises two quartz crystals in each arm; on account of the high value of the carrier frequency $P_o$, the crystals employed are of limited size and make it possible to house this filter in the same volume as the crystal filter of the previously described system. The advantages of this embodiment, which has transmission characteristics comparable to those of the previously described system, are to be found in its small number of members and small size, thus making it possible to considerably reduce all the expense connected with the installation of the system.

It is evident that the present invention is by no means limited to the described examples of embodiment, and that the same are capable of variants and modifications without departing from the scope of the invention.

What is claimed is:

1. In a multichannel carrier current communication system, a common carrier current transmission line for the transmission of signals having frequencies lying within a predetermined band of frequencies, a plurality of channels coupled to said common transmission line, each channel transmitting signals having frequencies lying within a given frequency range, a premodulation low pass filter in each channel to pass signals having frequencies lying within said given frequency range, a first modulator in each channel coupled to the output of its respective premodulation filter to provide first upper and low sidebands, means for supplying to all said first modulators a common carrier wave having a frequency higher than any of the frequencies lying within said predetermined band of frequencies, first band-pass filter means in each channel to select one of said first sidebands and having a sharper cut-off characteristic at that end of the pass-band nearest the carrier wave than at the other end, a second modulator in each channel coupled to the output of its respective first band-pass filter to provide second upper and lower sidebands, means for supplying to said second modulators carrier waves having frequencies different for each channel, second band-pass filter means to select one of said second sidebands in each channel, and means for coupling the output of said second band-pass filter means to said common transmission line.

2. In a multichannel carrier current communication system, a common carrier current transmission line for the transmission of signals having frequencies lying within a predetermined band of frequencies, a plurality of channels coupled to said common transmission line, each channel transmitting signals having frequencies lying within a given frequency range, a premodulation low pass filter in each channel to pass signals having frequencies lying within said given frequency range, a first modulator in each channel coupled to the output of its respective premodulation filter to provide first upper and low sidebands, means for supplying to all said first modulators a common carrier wave having a frequency higher than any of the frequencies lying within said predetermined band of frequencies, first band-pass filter means in each channel to select said first lower side band and having a sharper cut-off characteristic at the higher end of the pass band than at the lower end, a second modulator in each channel coupled to the output of the respective first band-pass filter to provide second upper and lower sidebands, means for supplying to said second modulators carrier waves having frequencies different for each channel, second band-pass filter means to select the lower second sideband in each channel, and means for coupling the output of said second band-pass filter means to said common transmission line.

3. In an electric carrier current communication system, a transmission line for the transmission of signals having frequencies lying within a given band of frequencies, a source of audio frequency signals, a low-pass filter coupled to said source, a first modulator coupled to said low-pass filter to provide first upper and lower sidebands, means for supplying to said first modulator a first carrier wave having a frequency higher than any of the frequencies lying within said given band of frequencies, a first band-pass filter coupled to said first modulator to select one of said first sidebands and having a sharper cut-off characteristic at that end of the pass-band nearest said carrier wave, a second modulator coupled to said first band-pass filter to provide second upper and lower sidebands, means for supplying to said second modulator a second carrier wave, a second band-pass filter coupled to said second modulator to select one of said second sidebands, and means for coupling the output of said second band-pass filter to said common transmission line.

4. In an electric carrier current communication system, a transmission line for the transmission of signals having frequencies lying within a given band of frequencies, a source of audio frequency signals, a low-pass filter coupled to said source, a first modulator coupled to said first low-pass filter to provide first upper and lower sidebands, means for supplying to said first modulator a first carrier wave having a frequency higher than any of the frequencies lying within said given band of frequencies, a first band-pass filter coupled to said first modulator to select said first lower sideband and having a sharper cut-off characteristic at the higher end of the pass band than at the lower end, a second modulator coupled to said first band-pass filter to provide second upper and lower side bands, means for supplying to said second modulator a second carrier wave, a second band-pass filter coupled to said second modulator to select the lower second sideband, and means for coupling the output of said second band-pass filter to said common transmission line.

5. A system according to claim 1 in which two stages of demodulation are employed at the receiver for each channel, the carrier frenquency used for the second stage of demodulation being the same as that used for the first modulation stage.

6. A system according to claim 3, in which these modulators (or demodulators) used in both stages of modulation (or demodulation) are of the branched bridge type.

7. A system according to claim 3 in which the two stages of modulation (or demodulation) are separated by a crystal band-pass filter.

ANTOINE FROMAGEOT.
MARC ANDRÉ LALANDE.
ROBERT REDARD

REFERENCES CITED

The following references are of record in the file of this patent:

UNITED STATES PATENTS

| Number | Name | Date |
|---|---|---|
| 2,270,385 | Skillman | Jan. 20, 1942 |

FOREIGN PATENTS

| Number | Country | Date |
|---|---|---|
| 520,756 | Great Britain | May 2, 1940 |
| 204,088 | Switzerland | July 1, 1939 |